Aug. 10, 1965 W. JACOBY 3,199,203

TAPE POSITION MARKER

Filed Feb. 11, 1964

INVENTOR.
WALTER JACOBY

BY Paul Maleson
ATTORNEY

United States Patent Office 3,199,203
Patented Aug. 10, 1965

3,199,203
TAPE POSITION MARKER

Walter Jacoby, Philadelphia, Pa., assignor of fifty percent to Hubert D. Yollin, Abington, Pa.

Filed Feb. 11, 1964, Ser. No. 344,101
9 Claims. (Cl. 33—172)

Figure 1:
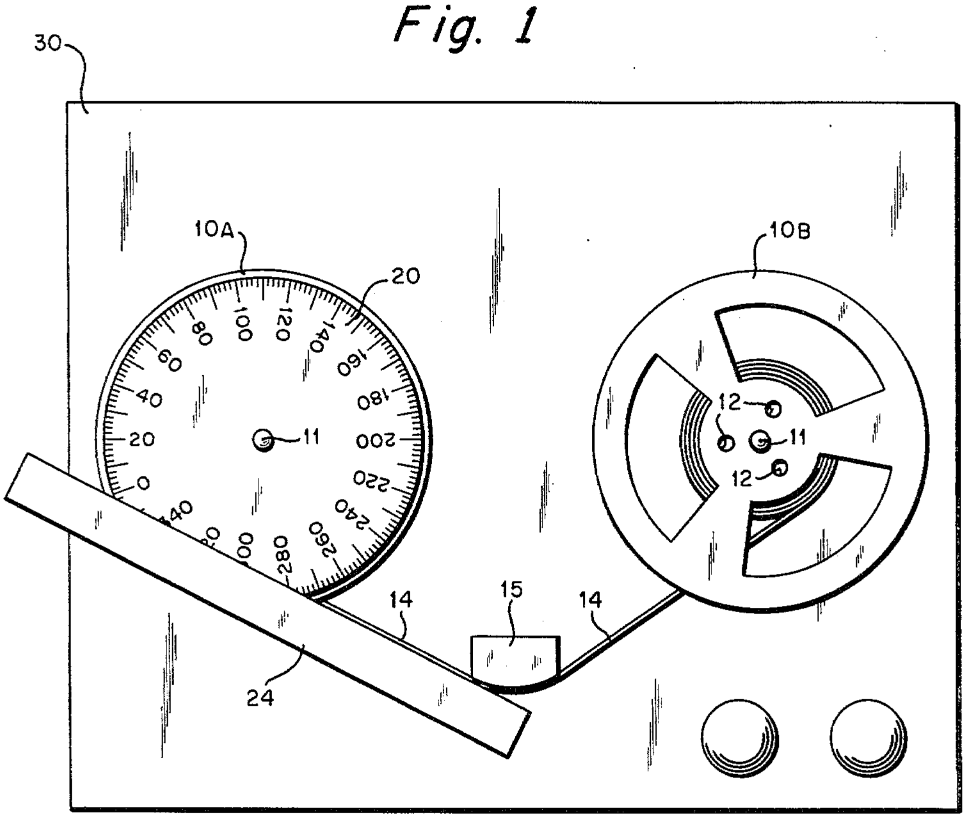

This invention relates to a tape position marker. More particularly, it relates to a device particularly adapted for use with tape recorders to provide a means to index or locate a position along the tape in an advantageous manner. It is apparent that this invention also may have utility in connection with reels similar to tape reels, such as reels of movie film, and the invention therefore also has application to movie editing reels. The particular field of application, however, is in sound recording tape reel indexing. Various means are known to provide tape indexing. Digital counters are provided on better machines of the professional and home recording type. Some machines, particularly some office dictating machines, use a shoe which runs against the outer surface of the tape on one reel and moves a lever across a scale. The digital devices are relatively expensive and are not supplied with small or cheap recorders. The shoe type is likewise not normally provided on low cost recorders and, in addition, is not highly accurate.

Other means have been the scribing of concentric circles or arcs either on tape reels or on the surface of recorders. This expedient has the advantage of inexpensiveness, but is not very accurate.

It has also been known to provide an attachment which can be positioned over a tape reel and individually marked at certain radial points, such as is shown in the patent to Carey, 2,802,290. The present invention has advantages over these known expedients.

It is an object of this invention to provide a tape position marker.

It is an object of this invention to provide a circumferential graduation on a tape reel and a straight edge to be superpositioned over the tape leaving or entering the reel.

It is yet another object of this invention to provide a disc having circumferential graduations and adapted to be removably affixed to a tape reel, in combination with a straight edge.

It is yet another object of this invention to provide a circumferentially graduated disc adapted to be removably affixed to a tape reel in combination with a straight edge having a transversely adjustable pivot at one end thereof.

Other aims and objects of this invention are made apparent in the following specification and claims.

Figure 2:
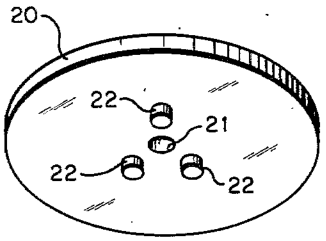
Figure 3:
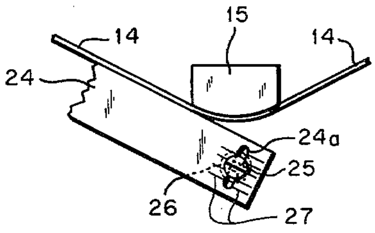

The invention is best understood in connection with the accompanying drawings in which like reference numerals refer to like parts and in which:

FIGURE 1 is a plan view of the tape deck equipped with the tape positioning marker, FIGURE 2 is a prospective view from below of the circumferentially graduated disc, and FIGURE 3 is a plan view of an alternate embodiment of the straight edge.

Broadly, this invention contemplates the combination of a single circumferentially graduated disc having gripping means thereon so that it may be placed over a tape reel with little or no relative rotational movement thereto, together with a straight edge which may or may not be pivotally mounted on the tape deck. Broadly, the operation of the device is as follows: when the disc is positioned on the reel, and the straight edge is positioned so that one edge thereof coincides with the tape exiting or entering the reel, the straight edge will intersect two graduated points on the disc. These two points together will provide an index which is applicable only to one point along the tape stored on the reel. Thus, any point along the tape may be noted by identifying the two index numbers. The graduated disc need not be stored with the individual tape reel; only the pertinent index numbers need be kept with (or related to) the reel of tape. The invention may be applied to transparent or nontransparent tape reels of varying diameter and on many different tape recorders. It may be applied to inexpensive, small, or portable tape recorders with little or no modification of the structure of the recorder. It may also be applied to larger and more carefully equipped recorders to give supplemental indexing means for further accuracy.

FIGURE 1 is a plan view of a tape deck generally designated 30. This tape deck carries the usual pair of shafts 11 on which are mounted the usual pair of reels 10A and 10B. As shown in FIGURE 1, in accord with generally accepted practice, the tape in the ordinary running position in coming off reel 10A and onto reel 10B.

Each reel, in the embodiment shown is provided with a plurality of holes 12 near the center thereof. The set of three such holes 12, as shown on reel 10B, are typical of the structure found in many tape reels. It is understood that other arrangements of openings or discontinuities on the face of the reel may also be found.

In FIGURE 1, the tape 14, coming off reel 10A, passes over head 15 and thence onto reel 10B. Controls, which form no part of this invention, are indicated at the lower right corner of tape deck 30 in FIGURE 1.

A disc 20 is provided. The disc 20 has a central hole 21 to fit over shaft 11. The only diameter requirement of disc 20 is that it be at least as large as the largest tape reel to be used on the machine. The thickness is not critical. The material of the disc 20 is not critical, although it preferably is transparent and typically is of a transparent synthetic plastic. Even if the tape reels are solid and opaque, without the large openings as shown on reel 10B, and even if disc 20 is also opaque, the invention still is operable.

Disc 20 is provided with means so that it may be removably affixed to the upper surface of a reel with minimum (and preferably no) relative rotational movement between it and the reel. In the embodiment shown in FIGURE 2, the underside of disc 20 is provided with a set of lugs extending downwardly therefrom and spaced so as to be snugly insertable into the holes 12 on reel 10B (and the similar holes on reel 10A).

In FIGURE 1, a tape deck 30 is shown in which the disc 20 has been placed over and affixed to reel 10A as has been described above. The circumference of disc 20 is printed or otherwise marked with uniform graduations. In the illustrated case, the graduations each represent 1-degree of the circumference, although it is understood that this choice of graduation spacing is arbitrary. For example, the circumference could be divided into 100 segments, although the 360-degree graduation is useful and preferred.

A straight edge 24 is provided. This may be a simple strip of metal, plastic, or similar material, having a straight edge. It need not be transparent, but may be conveniently made of transparent synthetic plastic. As shown, one longitudinal edge of straight edge 24 is superpositioned over tape 14 as it leaves reel 10A. The edge of straight edge 24 thus intersects the graduations on disc 20 at two points, at "358" and "276." These two numbers together comprise an index which identifies one and only one point along the tape 14. In the embodiment of FIGURE 1, the straight edge is shown suspended over tape deck 30, and would normally be held in this position by hand.

In the embodiment of FIGURE 3, an alternate form of the invention is shown. This modification lies in the straight edge 24. In this embodiment, the straight edge 24 is provided with a transverse aperature 24A near one end thereof. A pivot block 26 is affixed beneath straight edge 24 to the tape deck. A pivot extends upwardly therefrom and through transverse aperture 24A. This pivot is preferably threaded and receives a locking nut 25. Thus, by tightening down locking nut 25, the straight edge 24 may be held in any chosen position. It is apparent that this type of pivot is and of itself highly conventional and well known.

Preferably, calibrations 27 are provided as shown at various points along aperture 24A. Thus, not only can straight edge 24 be pivoted around the pivot block 26, but by moving it to various positions along aperture 24A, the operative edge of straight edge 24 can be properly and accurately aligned with tape 14. This transverse adjustment is desirable because it is apparent that the pivot block 26 does not exactly coincide with the point at which tape 14 "pivots" around head 15, so that there is a slight displacement between the two "pivot points." As the amount of tape on reel 10A increases or decreases, this slight discrepancy between the location of the "pivot points" requires that adjustments be made in the setting along the transverse aperture 24A so that straight edge 24 can be kept properly precisely aligned with tape 14. By the use of the calibrations 27, it is possible (though not necessary) to further specify the particular location along the transverse aperture 24A as well as the two number index taken from the disc.

While the combination of the lugs 22 and the holes 12 are suitable for many standard uses, it is, of course, recognized that different reels may have different points at which they may grip a disc 20. It is understood that the disc 20 may have any one of a number of different mechanical lugs to engage various known reels, and the mechanical elements specifically identified as lugs 22 in FIGURE 2, may be broadly termed gripping means. It is also apparent that the gripping means may simply be a pressure sensitive adhesive having a relatively low and temporary adhesive force. To use a disc 20 equipped with such an adhesive, it is only necessary to make an index mark on the surface of the reel corresponding with the zero point on the disc and to take care in setting the disc on the reel so that the index mark falls under the zero mark.

It is apparent from FIGURE 1, that the measurement may be made on either reel 10A or 10B. The measurements may be made from either side of any reel. While, in FIGURE 1, the "pivot point" of tape 14 is shown as a recording or play back head 15, it is well known that in many, if not most, recorders, there are additional and other pivot points, such as guides and the capstan drive. The requirement is that the measurement be made between the reel and the first point on the tape machine at which the tape leaving that reel undergoes a bend. This point may be termed the first pivot point.

The scope of this invention is to be determined by the appended claims and is not to be limited to the foregoing description and drawings which are illustrative.

I claim:

1. A tape position marker comprising a disc, said disc having gripping means on the underside thereof and having circumferential graduations on the upper side thereof, said gripping means being adapted to removably affix said disc to a tape reel to prevent relative rotation of said disc and said reel, tape contained on said reel, part of said tape extending therefrom to form an extension of said tape, and a straight edge having a straight longitudinal edge, said longitudinal edge of said straight edge being placed over said circumferential graduations and aligned with and superpositioned over said extension of said tape.

2. A tape position marker as set forth in claim 1 wherein said reel is mounted on a tape deck, and said tape deck has a first pivot point, and said extension of said tape extends from said reel to said first pivot point, said longitudinal edge being superpositioned over said tape between said reel and said first pivot point.

3. A tape position marker as set forth in claim 2 wherein said disc is provided with a center hole.

4. A tape position marker as set forth in claim 3 wherein said gripping means comprise a plurality of lugs.

5. A tape position marker as set forth in claim 4 wherein said straight edge is manually supported.

6. A tape position marker as set forth in claim 4 wherein said straight edge has an adjustable lockable pivot at one end thereof, said pivot being mounted on said tape deck.

7. A tape position marker as set forth in claim 6 wherein said straight edge is provided with a transverse aperture at one end thereof, and said pivot extends through said transverse aperture, whereby said straight edge may be transversely adjusted.

8. A tape position marker as set forth in claim 7 wherein calibrations are provided along said transverse aperture.

9. A straight edge mounted on the tape deck of a tape recorder and adapted to comprise a tape position marker, said straight edge having a transverse aperture near one end thereof, a pivot block under said transverse aperture, said pivot block being attached to said tape deck, a threaded pivot extending from said pivot block through said transverse aperture, a threaded locking nut on said pivot above said straight edge, and calibrations along said transverse aperture.

References Cited by the Examiner

UNITED STATES PATENTS

| | | | |
|---|---|---|---|
| 1,208,646 | 12/16 | Power | 33—172 |
| 2,043,914 | 6/36 | Wittell | 33—172 |
| 2,490,771 | 12/49 | Begun | 274—11 |
| 2,508,837 | 5/50 | Peffers | 33—174 |
| 2,802,290 | 8/57 | Carey | 40—2 |

FOREIGN PATENTS

| | | |
|---|---|---|
| 882,981 | 11/61 | Great Britain. |
| 346,547 | 1/22 | Germany. |

ISAAC LISANN, *Primary Examiner.*